(12) United States Patent
Nagatoshi

(10) Patent No.: US 7,436,597 B2
(45) Date of Patent: Oct. 14, 2008

(54) PROJECTION LENS

(75) Inventor: Yukiko Nagatoshi, Saitama (JP)

(73) Assignee: FUJINON Corporation, Saitama (JP)

( * ) Notice: Subject to any disclaimer, the term of this patent is extended or adjusted under 35 U.S.C. 154(b) by 0 days.

(21) Appl. No.: 11/953,180

(22) Filed: Dec. 10, 2007

(65) Prior Publication Data
US 2008/0137216 A1   Jun. 12, 2008

(30) Foreign Application Priority Data
Dec. 11, 2006   (JP) .............................. P2006-333507

(51) Int. Cl.
G02B 3/00   (2006.01)
G02B 3/02   (2006.01)
G02B 9/04   (2006.01)

(52) U.S. Cl. ................... 359/649; 359/651; 359/717; 359/793

(58) Field of Classification Search ................. 359/649, 359/650, 651, 708, 717, 793
See application file for complete search history.

(56) References Cited

U.S. PATENT DOCUMENTS 6,937,401 B2 *   8/2005   Sugano ................... 359/649

FOREIGN PATENT DOCUMENTS

| JP | 2002-365541 A | 12/2002 |
| JP | 2003-57540 A | 2/2003 |
| JP | 2004-177688 A | 6/2004 |
| JP | 2007-34082 A | 2/2007 |

* cited by examiner

Primary Examiner—William C. Choi
Assistant Examiner—Jack Dinh
(74) Attorney, Agent, or Firm—Birch, Stewart, Kolasch & Birch, LLP

(57) ABSTRACT

A first lens group having a negative refractive power, an aperture diaphragm, and a second lens group having a positive refractive power are arranged in order from an enlargement side. A reduction side of a projection lens is made essentially telecentric. Further, cemented triplet lenses, each of which includes cemented three lenses, are provided in the first lens group and the second lens group, respectively. Further, air spacing which enables placement of a mirror is ensured between the first lens group and the second lens group. Moreover, specific conditional expressions for the lens are satisfied.

21 Claims, 7 Drawing Sheets

EXAMPLE 1

EXAMPLE 1

EXAMPLE 3

EXAMPLE 1

EXAMPLE 1

EXAMPLE 2

EXAMPLE 3

EXAMPLE 4

EXAMPLE 5

PROJECTION LENS

BACKGROUND OF THE INVENTION

1. Field of the Invention

The present invention relates to a projection lens which projects in an enlarged manner display information, and the like, from a light bulb such as a liquid-crystal display element; and more particularly to a projection lens suitable for use with a display device of rear projection type, such as rear projection TV, and a projection-typed display device using the projection lens.

2. Description of the Related Art

A projection display device of front type and a projection display device of rear type have hitherto been known as a projection-type display device. In the display device of front type, a projection lens is disposed on the same side where a viewer is located with respect to a screen, and light emitted from the projection lens is projected on a reflection-type screen, to thus produce an image on the screen. In the display device of rear type, the projection lens is disposed opposite the viewer with the screen interposed therebetween, and the light emitted the projection lens is projected on a transmissive screen, to thus produce an image on the screen.

Of these rear projection-type display devices, the rear projection display device has been well known to have a structure in which elements ranging from a light source to a screen are housed in a cabinet and in which light carrying video information is projected from a projection lens disposed at the back onto the screen located on the front of the cabinet, as in the case of; for example, a rear projection TV.

Various projection lenses have recently been proposed for application to a projection display device of such a cabinet type (see JP-A-2002-365541, JP-A-2004-177688 and JP-A-2003-57540).

A reduction in profile and thickness of an overall projection display device of cabinet type has been desired. In order to fulfill such a desire, it is necessary to make an entire projection lens system compact by means of a positioning optical path deflection section that deflects an optical path, such as mirrors and a prism, in the projection lens system, to thus lay out the projection lens system in a folded geometry or by means of making the projection lens wide-angle to shorten a projection distance (a distance from the surface of the projection lens closets to the screen to the screen).

A projection display device of a type which forms a color image by use of a plurality of light valves requires a synthesis section for synthesizing light of colors from the respective light valves. Hence, a projection lens having a long back focus has been sought.

Moreover, in conjunction with an increase in the resolution of the light valves, great enhancement of resolution of the projection has been desired. In particular, in the case of a wide-angle projection lens, deterioration of resolution attribution attributable to a chromatic aberration has been taken as a problem.

Since it is difficult to fulfill both such desires, a projection lens fulfilling the desires on a high level have never been realized thus far.

For instance, in JP-A-2002-365541 and JP-A-2004-177688, there is proposed a projection lens which attempts to solve the problem of chromatic aberration by use of three cemented lenses and which has a long back focus. However, the projection lens does not have any space for arrangement of the optical path deflection section, such as a mirror, and hence difficulty is encountered in rendering the entire projection system compact.

In the mean time, a projection lens proposed in JP-A-2003-57540 uses the three cemented lenses and ensures the space. However, compensation of the chromatic aberration arising at the time of use of high-resolution light valves is insufficient. Moreover, since an enlargement-side lens is large, difficulty is encountered in making an attempt to render the entire projection lens system compact.

In view of the above, a projection lens capable of solving these problems is conceived (see JP-A-2007-34082).

Such a projection lens is extremely effective for solving the problems. However, in order to address recent compact light valves, further improvements are sought. Specifically, in these days, the speed of miniaturization of a light valve (a liquid-crystal panel or a DMD) is unprecedented. For instance, the size of one pixel is miniaturized at the rate of 20 to 30 percents or thereabouts, and a display surface of the light valve is also miniaturized significantly. Since the size of an image to be displayed is also miniaturized by far along with miniaturization of the light valves, various contrivances of an optical system, such as shortening of the focal length of the projection lens, are required.

SUMMARY OF THE INVENTION

The present invention has been conceived in light of the circumstances and aims at providing a high-resolution projection lens which is of a wide angle; which has a structure for enabling arrangement of an optical path deflection section in a system and suitable for miniaturization; which addresses miniaturization of recent light valves; and which can properly compensate especially for a chromatic aberration, as well as providing a projection display device using such a projection lens.

A first projection lens of the present invention comprises a first lens group having a negative refractive power; and a second lens group having a positive refractive power, the first lens group and the second lens group being arranged in order from an enlargement side, wherein an interval between the first lens group and the second lens group is set to longest air spacing in the projection lens;

each of the first lens group and the second lens group comprises at least one cemented triplet lens in which three lenses are cemented together; and conditional expression (1) through (4) provided below are satisfied $$-3.5 < f_1/f < -1.2 \tag{1}$$

$$8.0 \leq f_2/f < 12.0 \tag{2}$$

$$6.0 < D_{G1G2}/f \tag{3}$$

$$5.0 < Bf/f \tag{4).}$$

A second projection lens of the present invention comprises: a first lens group having a negative refractive power; and a second lens group having a positive refractive power, the first lens group and the second lens group being arranged in order from an enlargement side, wherein an interval between the first lens group and the second lens group is set to longest air spacing in the projection lens;

the first lens group comprises a cemented triplet lens in which one positive lens is sandwiched between two negative lenses, the cemented triplet lens being disposed on a side of the first lens group located closest to a reduction side;

the reduction side is made essentially telecentric; and
a conditional expression (5) provided below is satisfied $$-8.0 < f_{TC1}/f < -3.0 \quad (5).$$

A third projection lens of the present invention comprises: a first lens group having a negative refractive power; and a second lens group having a positive refractive power, the first lens group and the second lens group being arranged in order from an enlargement side, wherein an interval between the first lens group and the second lens group is set to longest air spacing in the projection lens;

the second lens group comprises at least one cemented triplet lens in which one negative lens is sandwiched between two positive lenses;

the reduction side is made essentially telecentric; and the conditional expression (1) through (4) and conditional expression (6) and (7) provided below are satisfied $$-0.15 < f/f_{TC2} < 0.1 \quad (6)$$

$$1.77 < N_d \quad (7).$$

In the first projection lens of the present invention, wherein at least one of the cemented triplet lenses disposed in the second lens group is formed by sandwiching one negative lens between two positive lenses; and the conditional expression (6) and (7) are satisfied.

In the first or third projection lens, a cemented triplet lens formed by sandwiching one positive lens between two negative lenses is disposed on a side of the first lens group closest to the reduction side; and the conditional expression (5) is satisfied.

In the projection lens of the present invention, conditional expression (8) and (9) provided below are preferably satisfied $$10.0 < D_{G1G2}/f \quad (8)$$

$$6.5 < Bf/f \quad (9).$$

Reference symbols employed in the conditional expressions (1) through (9) denote the followings:

f: a focal length of the entire system $f_1$: a focal length of a first lens group $f_2$: a focal length of a second lens group $D_{G1G2}$: air spacing between the first lens group and the second lens group Bf: an air equivalent length between a reduction-side lens surface of a lens, closest to the reduction side, of the second lens group and a reduction-side image-formation surface of the projection lens $f_{TC1}$: a focal length of a cemented triplet lens located on a side of the first lens group closest to the reduction side $f_{TC2}$: a focal length of a cemented triplet lens placed in the second lens group $N_d$: a refractive index of, with respect to d-line, a negative lens constituting the cemented triplet lens located in the second lens group.

In the projection lens of the present invention, the first lens group can be built from, in order from the enlargement side, an aspherical lens having a small refractive power, a negative meniscus lens whose concave surface is oriented toward the reduction side, and a cemented triplet lens formed by sandwiching one biconvex lens between two negative lenses; and an optical path deflection section that deflects an optical path can be interposed between the first lens group and the second lens group.

The expression "aspherical lens having a small refractive power" means that a lens function of the aspherical lens is primarily to compensate for an aberration and that power is imparted together with an aberration compensation function.

An aspherical lens is disposed in each of: a side of the first lens group closest to the enlargement side; and the second lens group, and the aspherical lens placed on a side of the first lens group closest to the enlargement side is configured so as to be able to move in the direction of an optical axis of the first lens group according to a change in projection distance, thereby enabling compensation for a curvature of field induced by the change in projection distance. Moreover, the first lens group can be configured so as to be able to move in the direction of the optical axis of the first lens group, to thus enable adjustment of a focus.

A projection display device of the present invention comprises a light source; a light valve; an illumination optical section that guides a luminous flux from the light source to the light valve; and the projection lens of the present invention, wherein the luminous flux from the light source is optically modulated by the light valve and projected on a screen by means of the projection lens.

DETAILED DESCRIPTION OF THE INVENTION

Figure 1:
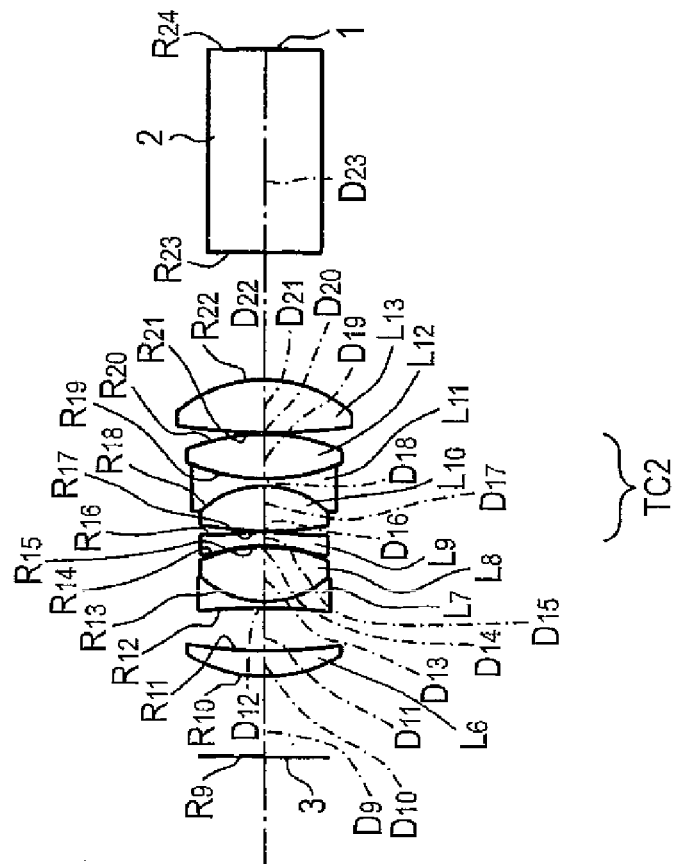
FIG. 1 is a view showing the configuration of a projection lens of Example 1 of the present invention.
Figure 1:
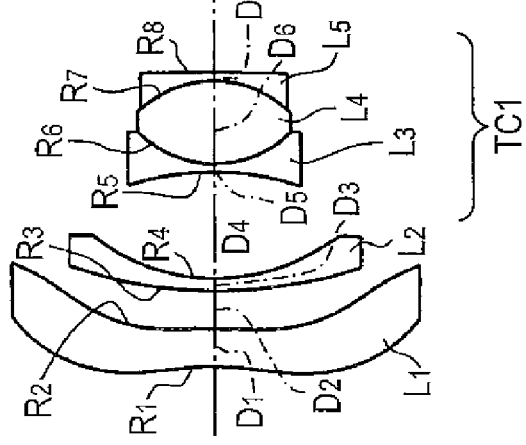

Embodiments of the present invention will be described hereunder by reference to the drawings. FIG. 1 shows a projection lens of the present invention and serves as a lens layout drawing for Examples 1 and 2 to be described later. The lens will be described below as a typical lens of the present embodiment. In the drawing, reference symbol X denotes an optical axis.

In a projection lens of the present embodiment, a first lens group $G_1$ having negative refractive power, an aperture diaphragm 3, and a second lens group $G_2$ having positive refractive power are arranged in order from an enlargement side, and a reduction side of the projection lens is made telecentric. A cemented triplet lens TC1 into which three lenses are cemented together is placed in the first lens group $G_1$, and another cemented triplet lens TC2 is placed in the second lens group $G_2$.

The cemented triplet lens TC1 is formed by means of interposing a fourth lens $L_4$ formed from one positive lens between third and fifth lenses $L_3$ and $L_5$ formed from two negative lenses; and is positioned on a side of the first lens group G1 closest to the reduction side. A first lens L1 and a second lens L2 are arranged, in order from the enlargement side, at positions closer to the enlargement side than to the cemented triplet lens TC1 in the first lens group G1.

The cemented triplet lens TC2 is formed by means of interposing an eleventh lens $L_{11}$ formed from one negative lens between tenth and twelfth lenses $L_{10}$ and $L_{12}$ formed from two positive lenses. A sixth lens $L_6$, a seventh lens $L_7$, an eighth lens $L_8$, and a ninth lens $L_9$ are arranged in the second lens group $G_2$, in this order from the enlargement side, at positions close to the enlargement side when compared with the cemented triplet lens TC2. A thirteenth lens $L_{13}$ is placed at a position closer to the reduction side when compared with the cemented triplet lens TC2. The seventh lens $L_7$ and the eighth lens $L_8$ are cemented together.

In the projection lens shown in FIG. 1, a luminous flux—which has entered from the right side of a drawing sheet and which is provided with image information—is incident on the projection lens by way of a glass block 2. An image is projected in an enlarged manner in a leftward direction of the drawing sheet by means of the projection lens. FIG. 1 shows only one light valve 1 for ease of viewing. However, in a projection display device, a luminous flux from the light source is separated into light of the primary colors by means of a color separation optical system. Three light valves are provided for light of each color, thereby enabling displaying of a full-color image. A color synthesis section, such as a cross dichroic prism, is placed at the position of the glass block 2, thereby enabling synthesis of light of the primary colors.

Figure 3:
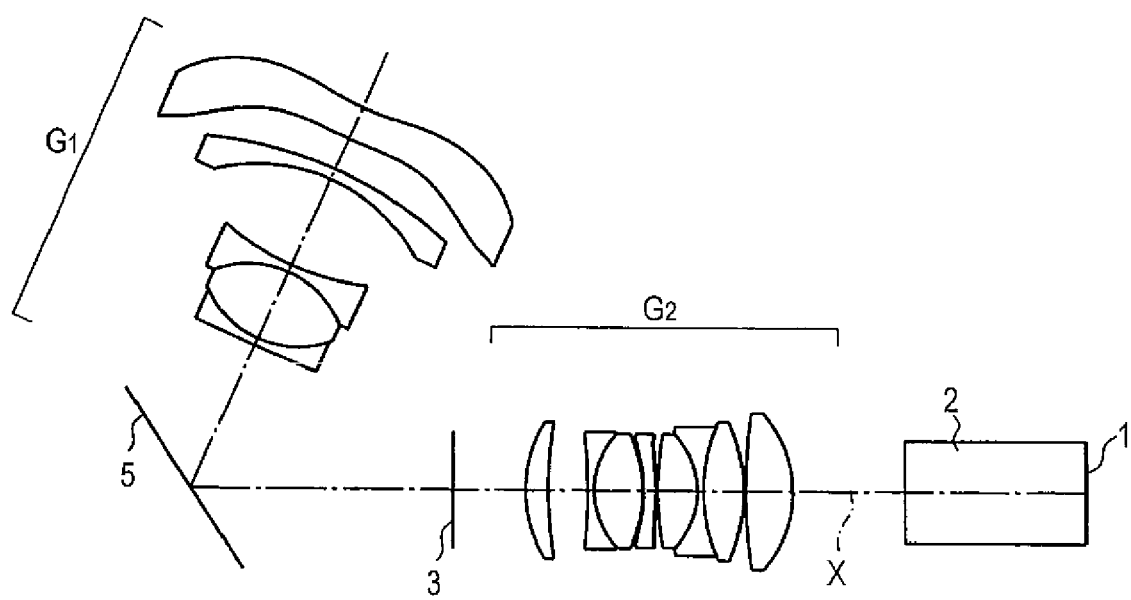
FIG. 3 is a view showing the configuration of the projection lens shown in FIG. 1 achieved when a mirror is disposed at a predetermined position.

The projection lens of the present embodiment is configured in such a way that the longest air spacing exists between the first lens group $G_1$ and the second lens group $G_2$ in the projection lens; and satisfies the following conditional expressions (1) through (7). A projection lens shown in FIG. 3 shows a structure acquired when a mirror 5 is provided as an optical path deflection section that deflects an optical path.

$$-3.5 < f_1/f < -1.2 \tag{1}$$

$$8.0 \leq f_2/f < 12.0 \tag{2}$$

$$6.0 < D_{G1G2}/f \tag{3}$$

$$5.0 < Bf/f \tag{4}$$

$$-8.0 < f_{TC1}/f < -3.0 \tag{5}$$

$$-0.15 < f/f_{TC2} < 0.1 \tag{6}$$

$$1.77 < N_d \tag{7}$$

where f: a focal length of an entire system $f_1$: a focal length of a first lens group $f_2$: a focal length of a second lens group $D_{G1G2}$: air spacing between the first lens group and the second lens group Bf: an air equivalent length between a reduction-side lens surface of a lens, closest to the reduction side, of the second lens group and a reduction-side image-formation surface of the projection lens $f_{TC1}$: a focal length of a cemented triplet lens located on a side of the first lens group closest to the reduction side $f_{TC2}$: a focal length of a cemented triplet lens placed in the second lens group Nd: a refractive index of, with respect to d-line, a negative lens constituting the cemented triplet lens located in the second lens group.

By means of the above-mentioned configuration, the projection lens of the present embodiment is configured to be wide-angle; to enable arrangement of the mirror 5 in the system; and to be suitable for miniaturization. The projection lens can well compensate for aberrations; in particular, a chromatic aberration, thereby enabling enhancement of a resolution. The constituent elements are set so as to become relevant to each other, and hence all of these working-effects can be yielded as a result of satisfaction of the above-mentioned conditions. The conditional expression (1) through (7) which impart comparatively-large influence on the respective working-effects will be described hereunder.

The conditional expression (1) specifies a ratio of the focal length $f_1$ of the first lens group $G_1$ to the focal length "f" of the entire system. When the ratio has fallen below the lower limit value, the power of the first lens group $G_1$ becomes excessively small, so that the first lens group $G_1$ becomes bulky. In contrast, when the ratio has exceeded the upper limit value, the power of the first lens group $G_1$ becomes excessively large, thereby posing difficulty in compensation of aberrations.

The conditional expression (2) specifies a ratio of the focal length $f_2$ of the second lens group $G_2$ to the focal length "f" of the entire system. When the ratio has fallen below the lower limit value, the power of the second lens group $G_2$ becomes excessively large, thereby posing difficulty in compensation of aberrations. In contrast, when the ratio has exceeded the upper limit value, the power of the second lens group $G_2$ becomes excessively small, so that the second lens group $G_2$ becomes bulky. In particular, as a result of the conditional expression (2) being satisfied, the projection lens can address a case where significantly-miniaturized light valves are adopted. Specifically, miniaturization of a pixel of the light vale has recently advanced, and implementation of significantly-miniaturized light valves in a projection display device has become possible. A display surface of such a light valve is miniaturized, so that a displayed image is also miniaturized. Accordingly, an attempt is made to optimize a focal length of the projection lens by satisfaction of the conditional expression (2), thereby ensuring the effectiveness of the significantly-miniaturized light valves.

Figure 4:
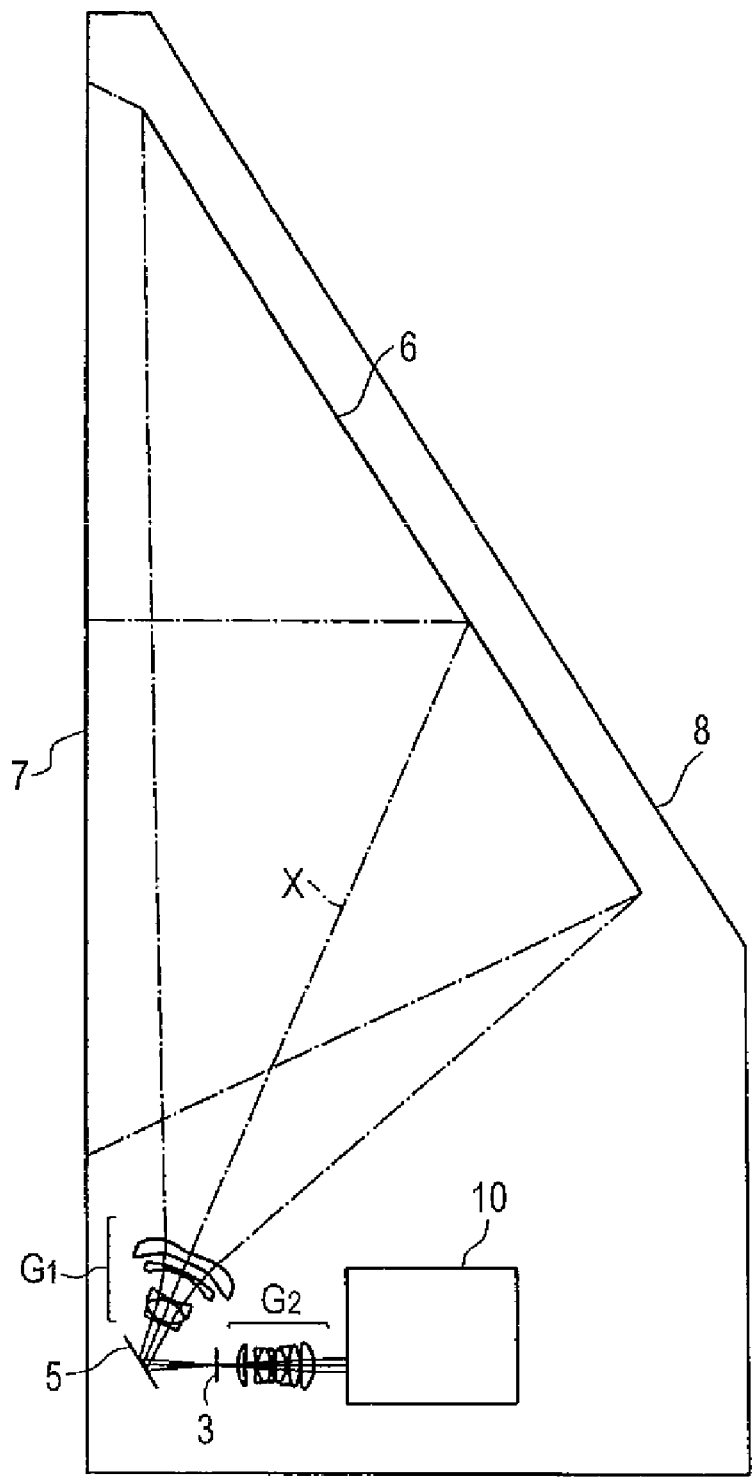
FIG. 4 is a view showing a general configuration of a projection display device of the present invention.

The conditional expression (3) is set for ensuring air spacing—where the mirror 5 for deflecting an optical path can be placed—between the first lens group $G_1$ and the second lens group $G_2$ and for miniaturizing the system. When the ratio has fallen below the lower limit value, difficulty is encountered in placing the mirror 5, or a limitation is imposed on a deflection (bending) angle. As shown in FIG. 4, placing the mirror 5 for deflecting an optical path at the above position is a technique effective for miniaturizing the rear projection display device. As in the case of the conditional expression (2), the projection lens can be made adaptive for the case where significantly-miniaturized light valves are adopted by satisfaction of the conditional expression (3).

The conditional expression (4) specifies a back focus of the projection lens, setting a sufficiently-required back focus which is required as a space where a prism for color synthesis purpose, or the like, is positioned on the reduction side of the projection lens. When the back focus has fallen below the lower limit value, difficulty is encountered in inserting a prism for color synthesis purpose, or the like. As in the case of the conditional expression (2), the projection lens can be made adaptive for the case where significantly-miniaturized light valves are adopted by satisfaction of the conditional expression (4).

The conditional expression (5) specifies a ratio of a focal length $f_{TC1}$ of the cemented triplet lens TC1 placed in the first lens group $G_1$ to the focal length "f" of the entire system. When the ratio has become fallen below the lower limit value, the power of the cemented triplet lens TC1 becomes excessively small, which in turn renders the first lens group $G_1$ bulky. Moreover, when the ratio has exceeded the upper limit value, the power of the cemented triplet lens TC1 becomes excessively great, thereby posing difficulty in compensation of aberrations.

The conditional expression (6) specifies a ratio of a focal length $f_{TC2}$ of the cemented triplet lens TC2 placed in the second lens group $G_2$ to the focal length "f" of the entire system. When the ratio has become exceeded the range, the power of the cemented triplet lens TC2 becomes excessively great, thereby posing difficulty in compensation of aberrations.

The conditional expression (7) specifies a refractive index $N_d$ of, with respect to d-line, the negative lens (the eleventh lens $L_{11}$) constituting the cemented triplet lens TC2 located in the second lens group $G_2$. When a value has fallen below the lower limit value, it becomes difficult for cemented surfaces of the cemented triplet lens TC1 to compensate for; especially, a high-order chromatic aberration, thereby leading to deterioration of function.

In the projection lens of the present embodiment, the two cemented triplet lenses TC1 and TC2 are provided in the first lens group $G_1$ and the second lens group $G_2$, respectively. As a result, the entire system can be miniaturized while a chromatic aberration (especially a high-order chromatic aberration) is well compensated for.

In the projection lens of the present embodiment, an aspheric lens (the first lens $L_1$) provided in the first lens group $G_1$ is moved in the direction of an optical axis X of the first lens group $G_1$, thereby compensating for a curvature of field induced by a change in projection distance. Further, the first lens group $G_1$ is moved in the direction of the optical axis X, thereby adjusting a focus.

An embodiment of the projection display device of the present invention will now be described. FIG. 4 is a longitudinal cross-sectional view of a projection display device of the embodiment of the present invention, and FIG. 5 is a block diagram showing an example of an illumination optical system 10 shown in FIG. 4.

The projection display device shown in FIG. 4 is a rear projection display device which particularly exhibits a working-effect of the projection lens. A light source, light valves, an illumination optical section for guiding a luminous flux from the light source to a light valve (the light source, the light valves, and the illumination optical section are included in the illustrated illumination optical system 10), and the projection lens are disposed in a cabinet 8. The luminous flux from the light source is optically modulated by the light valves, and the luminous flux carrying image information is projected on the back of a screen 7 spaced at a predetermined distance by way of the projection lens and a rear mirror 6. A viewer views the image enlargedly projected on the screen 7 from the front side (i.e., the left side of the drawing sheet) of the screen 7.

Figure 5:
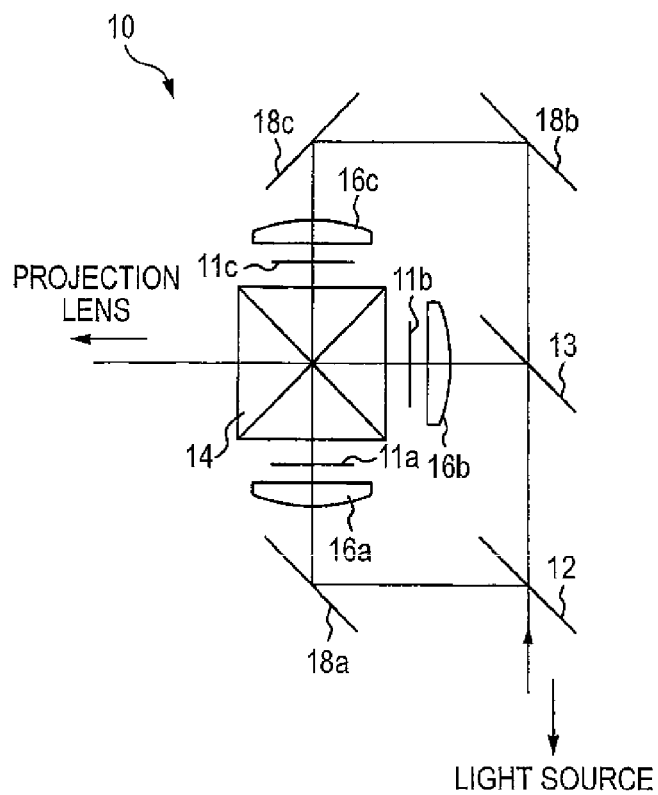
FIG. 5 is a view showing the configuration of an illumination optical system of the projection display device.
Figure 6:
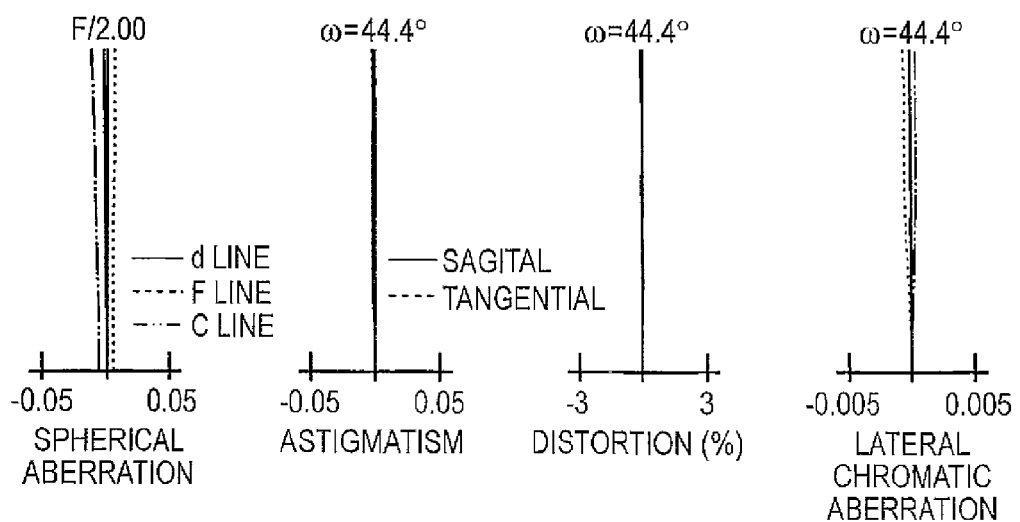
FIG. 6 is a view of aberrations of the projection lens of Example 1.
Figure 7:
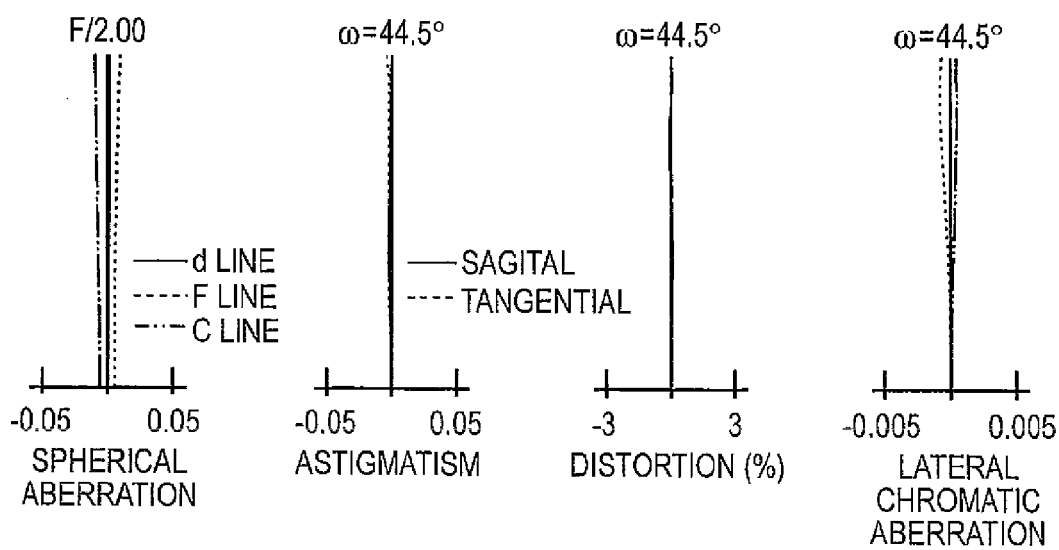
FIG. 7 is a view of aberrations of a projection lens of Example 2.
Figure 8:
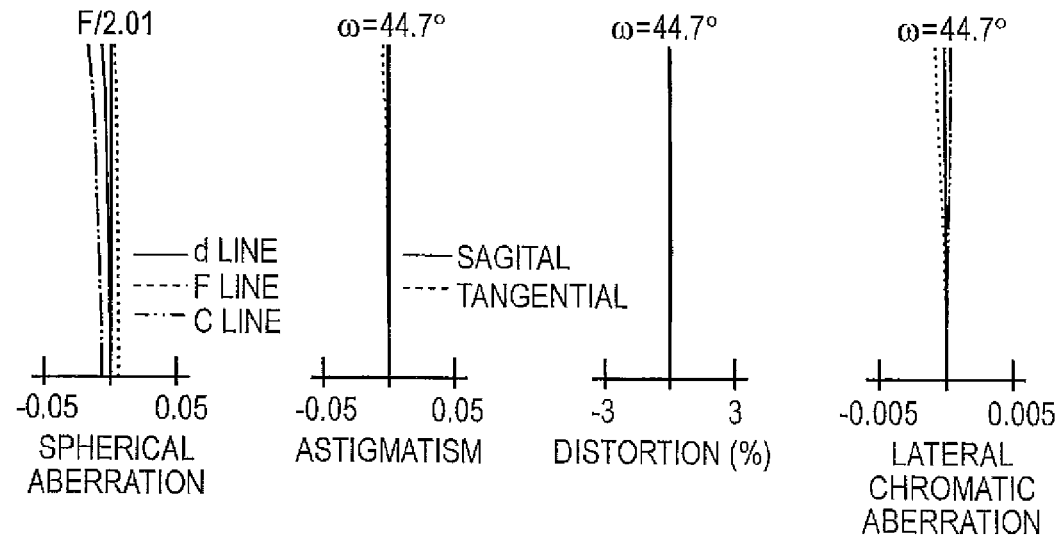
FIG. 8 is a view of aberrations of the projection lens of Example 3.
Figure 9:
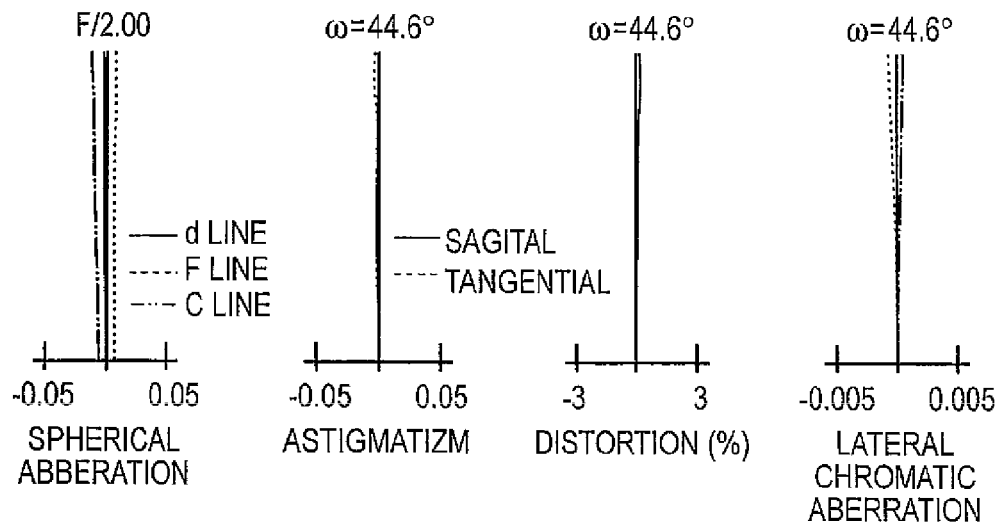
FIG. 9 is a view of aberrations of a projection lens of Example 4.
Figure 10:
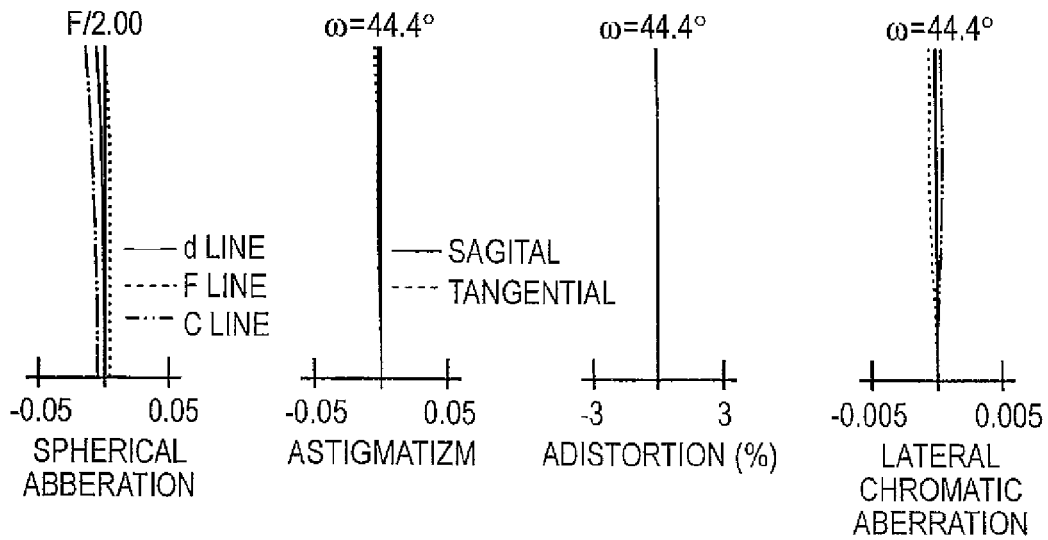
FIG. 10 is a view of aberrations of a projection lens of Example 5.

As shown in FIG. 5, the illumination optical system 10 has transmissive liquid-crystal panels 11a to 11c serving as light valves; dichroic mirrors 12 and 13 for color separation purpose; across dichroic prism 14 for synthesizing colors; capacitor lenses 16a to 16c; and total reflection mirrors 18a to 18c. Although a front stage of the dichroic mirror 12 is omitted from the drawing, white light from the light source enters the respective liquid-crystal panels 11a to 11c corresponding to three colors of luminous fluxes (G light, B light, and R light) by way of the illumination optical system, and the luminous fluxes are subjected to color modulation. The light is projected on the screen 7 by means of the projection lens shown in FIG. 4.

Since the projection display device uses the projection lens of the present invention, a high-resolution large screen whose chromatic aberration has been well compensated for can be acquired. Moreover, the mirror 5 for deflecting an optical path is interposed between the first lens group $G_1$ and the second lens group $G_2$ of the projection lens, thereby bending the optical path acutely. Hence, a reduction in profile and thickness of the projection display device becomes feasible.

Figure 2:
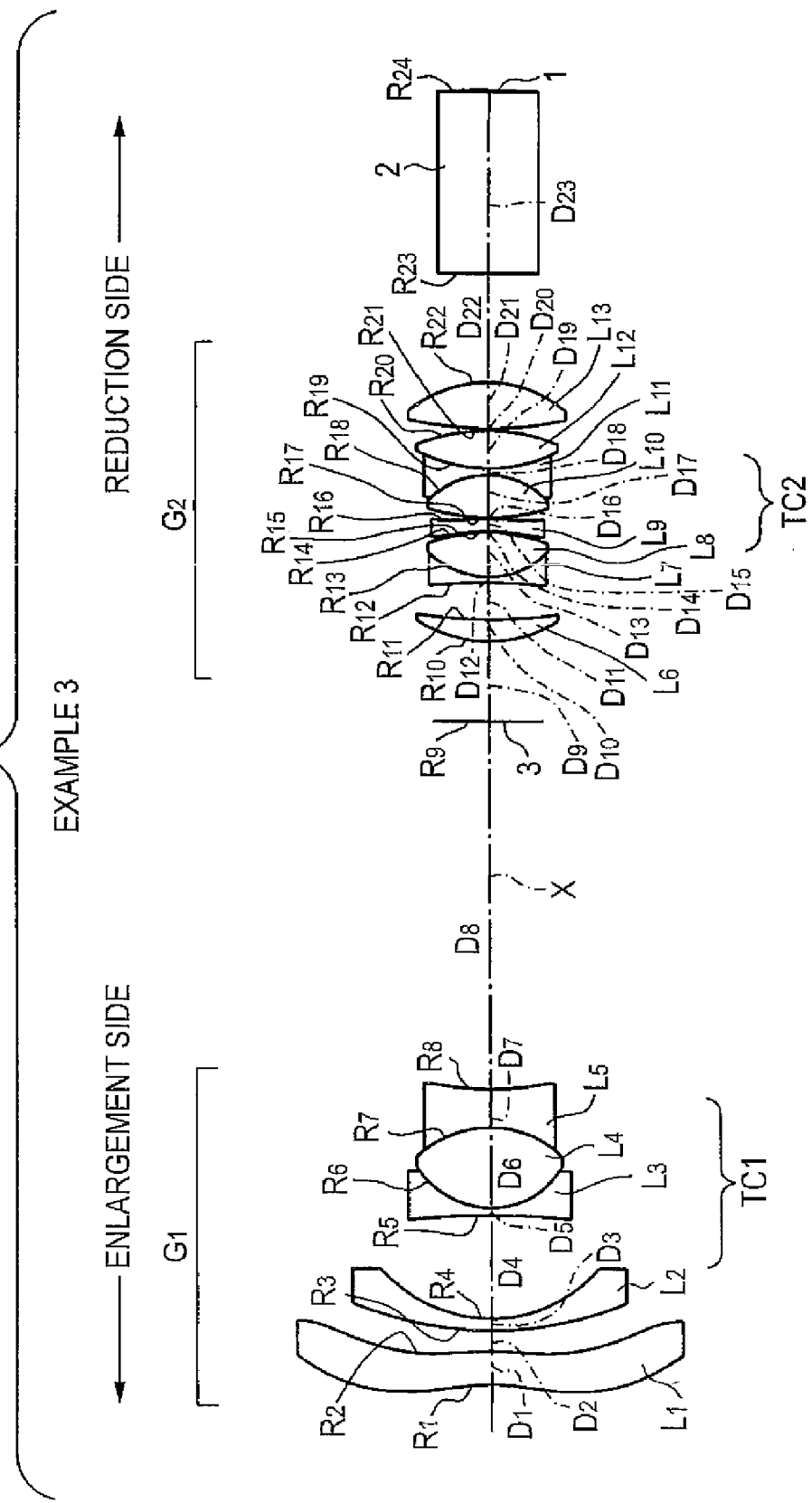
FIG. 2 is a view showing the configuration of a projection lens of Example 3 of the present invention.

Specific examples of the projection lens of the present invention will be described hereunder. In FIG. 2 showing the configuration of Example 3, members which yield the same working-effects as those yielded in Example 1 are assigned the same reference numerals as those used in FIG. 1. Numerals provided in the respective embodiments below are acquired when a focal length is standardized to 1.0.

In the present embodiment, the cemented triplet lens TC1 is placed in the first lens group $G_1$, and the cemented triplet lens TC2 is placed in the second lens group $G_2$. However, even when the cemented triplet lens TC1 or TC2 may also be placed in only the lens group $G_1$ or the lens group $G_2$, an effect analogous to that mentioned above can be yielded to a certain extent.

EXAMPLE 1

As shown in FIG. 1, the projection lens of Example 1 includes the first lens group G1 having negative refractive power, the aperture diaphragm 3, and the second lens group G2 having positive refractive power, which are arranged in order from the enlargement side. The reduction side of the projection lens is made essentially telecentric.

In the first lens group $G_1$, the first lens $L_1$ formed from an aspherical lens whose convex surface is oriented toward the enlargement side, the second lens $L_2$ formed from a negative meniscus lens whose concave surface is oriented toward the reduction side, and the cemented triplet lens TC1 formed by sandwiching the fourth lens $L_4$ formed from one biconvex lens between the third and fifth lenses $L_3$ and $L_5$ are arranged in order from the enlargement side.

In the meantime, in the second lens group $G_2$, there are arranged the sixth lens $L_6$ formed from a positive meniscus lens whose convex surface is oriented toward the enlargement side, the seventh lens $L_7$ formed from a biconcave lens, the eighth lens $L_8$ formed from a biconvex lens, the ninth lens $L_9$ formed from an aspherical lens whose convex surface is oriented toward the reduction side, the cemented triplet lens TC2 built by sandwiching the eleventh lens $L_{11}$ formed from one negative lens between the tenth and twelfth lenses $L_{10}$ and $L_{12}$ formed from positive lenses, and the thirteenth lens $L_{13}$ formed from a biconvex lens. The seventh lens $L_7$ and the eighth lens $L_8$ are cemented together.

The geometry of each of the aspherical surfaces is specified by an aspherical surface expression provided blow. In the case of the first lens $L_1$ and the ninth lens $L_9$, each of which has an aspherical surface, an effect can be yielded even by means of a lens whose one surface is aspherical. However, a lens whose both surfaces are aspherical is more preferable.

$$Z = \frac{Y^2/R}{1 + \sqrt{1 - K \times Y^2/R}} + \sum_{i=3}^{20} A_i Y^i$$

where

Z: the length of a line normal to a tangential plane (a plane perpendicular to an optical axis) of an aspherical apex from a point in an aspherical plane separated from the optical axis by a distance Y Y: a distance from the optical axis R: a radius of curvature of the aspherical surface acquired in the vicinity of the optical axis K: eccentricity $A_i$: an aspherical coefficient (i=3 to 20)

The projection lens of Example 1 is configured so as to satisfy the conditional expressions (1) through (7). However, in connection with the conditional expressions (3) and (4), the projection lens is configured so as to satisfy the following conditional expression (8) and (9) whose lower limit values are set to more desirable numerals.

$$10.0 < D_{G1G2}/f \quad (8)$$

$$6.5 < Bf/f \quad (9)$$

FIG. 1 shows the light bulb 1 and the glass block 2. The projection lens of Example 1 has air spacing—where a mirror for deflecting an optical path can be disposed—provided between the first lens group $G_1$ and the second lens group $G_2$. As shown in FIG. 3, the mirror 5 can be provided in the spacing. Since the projection lens is configured such that the reduction side of the projection lens becomes telecentric, the projection lens is suitable for a configuration where a color synthesis section is provided as the glass block 2.

An upper row of Table 1 shows a value of a radius of curvature R (standardized by means of taking a focal length as one; and the same also applies to corresponding descriptions of Examples provided below) of each of lens surfaces of the projection lens of Example 1, a value of the center thickness of each of the lenses, a value of air spacing (hereinafter referred to as "on-axis surface spacing") D between the lenses, a value of a refractive index $N_d$ achieved along d-line of each of the lenses, and a value of an Abbe number $v_d$ achieved along d-line of each of the lenses. Numerals of surface numbers provided in Table 1 and subsequent tables represent a sequence from the enlargement side. A surface having an asterisk provided on the left side of a surface number is taken as an aspherical surface. In Example 1 and subsequent Examples 2 to 5, the curvature of radius R of each of the aspherical surfaces is provided, in each of the tables, as a value of the radius curvature of R achieved along the optical axis X. However, in order to make the drawings easy to see, a leader line is not always withdrawn from a point of intersection of a radius and the optical axis X in a corresponding lens configuration diagram.

As mentioned above, in the projection lens of Example 1, the first lens $L_1$ is moved in the direction of the optical axis X according to a change in projection distance. Lower rows of Table 1 exemplify a relationship between a projection distance (spacing between a conjugate position on the enlargement side and the first surface of the lens) and air spacing (variable spacing) between the first lens $L_1$ and the second lens $L_2$.

TABLE 1

Focal Length F = 1.00

| Surface Nos. | R | D | $N_d$ | $v_d$ |
|---|---|---|---|---|
| 1* | −7.556 | 1.163 | 1.49100 | 57.6 |
| 2* | −24.815 | 1.164 | | |
| 3 | 14.056 | 0.382 | 1.84666 | 23.8 |
| 4 | 6.105 | 3.266 | | |
| 5 | −8.749 | 0.258 | 1.71300 | 53.9 |
| 6 | 3.325 | 2.546 | 1.60342 | 38.0 |
| 7 | −3.331 | 0.258 | 1.80400 | 46.6 |
| 8 | −89.812 | 14.420 | | |
| 9 (STO) | ∞ | 2.501 | | |
| 10 | 4.478 | 0.800 | 1.84666 | 23.8 |
| 11 | 15.392 | 1.329 | | |
| 12 | −17.969 | 0.199 | 1.80400 | 46.6 |
| 13 | 2.902 | 1.695 | 1.49700 | 81.6 |
| 14 | −4.769 | 0.033 | | |
| 15* | −4.166 | 0.416 | 1.49100 | 57.6 |
| 16* | −7.396 | 0.033 | | |
| 17 | 10.727 | 1.392 | 1.48749 | 70.2 |
| 18 | −2.868 | 0.216 | 1.83400 | 37.2 |
| 19 | 5.902 | 1.373 | 1.49700 | 81.6 |
| 20 | −6.264 | 0.050 | | |
| 21 | 18.092 | 1.632 | 1.49700 | 81.6 |
| 22 | −4.197 | 3.919 | | |
| 23 | ∞ | 6.185 | 1.51633 | 64.1 |
| 24 | ∞ | | | |

*designates an aspherical surface
Spacing between a conjugate position on the enlargement side and the first surface of a lens: 106.349

Table 2 shows values of respective constants K and $A_3$ to $A_{12}$ corresponding to respective aspherical surfaces.

TABLE 2

Aspherical Coefficients

| Surface Nos. | K | $A_3$ | $A_4$ | $A_5$ | $A_6$ |
|---|---|---|---|---|---|
| 1 | 1.000 | $-5.762 \times 10^{-3}$ | $1.406 \times 10^{-2}$ | $-2.138 \times 10^{-3}$ | $-3.525 \times 10^{-4}$ |
| 2 | −2.798 | $-6.930 \times 10^{-3}$ | $1.305 \times 10^{-2}$ | $-2.017 \times 10^{-3}$ | $-3.697 \times 10^{-5}$ |
| 15 | 1.000 | 0.000 | $1.370 \times 10^{-2}$ | 0.000 | $-3.692 \times 10^{-4}$ |
| 16 | 1.000 | 0.000 | $1.347 \times 10^{-2}$ | 0.000 | $-2.296 \times 10^{-4}$ |

TABLE 2-continued

| | Aspherical Coefficients | | | | | |
|---|---|---|---|---|---|---|
| Surface Nos. | $A_7$ | $A_8$ | $A_9$ | $A_{10}$ | $A_{11}$ | $A_{12}$ |
| 1 | $1.373 \times 10^{-4}$ | $-8.226 \times 10^{-6}$ | $-1.286 \times 10^{-6}$ | $1.153 \times 10^{-7}$ | $1.018 \times 10^{-8}$ | $-9.790 \times 10^{-10}$ |
| 2 | $1.229 \times 10^{-5}$ | $-1.622 \times 10^{-6}$ | $1.759 \times 10^{-6}$ | $-1.067 \times 10^{-7}$ | $-5.995 \times 10^{-8}$ | $6.562 \times 10^{-9}$ |
| 15 | 0.000 | $1.971 \times 10^{-5}$ | 0.000 | $6.282 \times 10^{-6}$ | 0.000 | 0.000 |
| 16 | 0.000 | $2.431 \times 10^{-6}$ | 0.000 | $9.676 \times 10^{-6}$ | 0.000 | 0.000 |

Values corresponding to the respective conditional expressions (1) through (7) of Example 1 are as provided in Table 11 which will be described later, and all of the conditional expressions (1) through (7) are satisfied (all of the conditional expression (8) and (9) are also satisfied).

EXAMPLE 2

A projection lens of Example 2 is essentially identical in configuration to a projection lens of Example 3 which is shown in FIG. 2 and which will be described later. FIG. 2 is used as an example overview, and explanations about common elements are omitted.

Specifically, in the projection lens of Example 1, the fifth lens $L_5$ is embodied as a negative meniscus lens whose concave surface is oriented toward the enlargement side. In contrast, the present example and subsequent examples differ from Example 1 in that the fifth lens $L_5$ is embodied by a biconcave lens. In other respects, all of the examples have a common basic configuration.

An upper row of Table 3 shows a value of a radius of curvature R of each of lens surfaces of the projection lens of Example 2, a value of on-axis surface spacing D of each of the lenses, a value of a refractive index $N_d$ achieved along d-line of each of the lenses, and a value of an Abbe number $v_d$ achieved along d-line of each of the lenses. Lower rows of Table 3 show a projection distance (spacing between a conjugate position on the enlargement side and the first surface of the lens).

TABLE 3

| | Focal Length F = 1.00 | | | |
|---|---|---|---|---|
| Surface Nos. | R | D | $N_d$ | $v_d$ |
| 1* | −7.320 | 1.105 | 1.49100 | 57.6 |
| 2* | −14.564 | 0.582 | | |
| 3 | 10.549 | 0.407 | 1.84666 | 23.8 |
| 4 | 4.820 | 3.043 | | |
| 5 | −33.272 | 0.271 | 1.69680 | 55.5 |
| 6 | 3.324 | 2.874 | 1.62004 | 36.3 |
| 7 | −3.778 | 0.997 | 1.80400 | 46.6 |
| 8 | 11.270 | 14.197 | | |
| 9 (STO) | ∞ | 2.264 | | |
| 10 | 4.795 | 0.763 | 1.84666 | 23.8 |
| 11 | 18.079 | 1.596 | | |
| 12 | −15.807 | 0.206 | 1.80400 | 46.6 |
| 13 | 2.958 | 1.644 | 1.49700 | 81.6 |
| 14 | −5.021 | 0.033 | | |
| 15* | −4.969 | 0.416 | 1.49100 | 57.6 |
| 16* | −10.668 | 0.033 | | |
| 17 | 8.325 | 1.463 | 1.48749 | 70.2 |
| 18 | −3.060 | 0.223 | 1.83400 | 37.2 |
| 19 | 6.116 | 1.343 | 1.49700 | 81.6 |
| 20 | −6.479 | 0.050 | | |
| 21 | 16.693 | 1.607 | 1.49700 | 81.6 |
| 22 | −4.300 | 3.912 | | |
| 23 | ∞ | 6.184 | 1.51633 | 64.1 |
| 24 | ∞ | | | |

*designates an aspherical surface
Spacing between a conjugate position on the enlargement side and the first surface of a lens: 106.487

Table 4 shows values of respective constants K and $A_3$ to $A_{12}$ corresponding to respective aspherical surfaces.

TABLE 4

| | Aspherical Coefficients | | | | |
|---|---|---|---|---|---|
| Surface Nos. | K | $A_3$ | $A_4$ | $A_5$ | $A_6$ |
| 1 | 1.000 | $-5.933 \times 10^{-3}$ | $1.386 \times 10^{-2}$ | $-2.103 \times 10^{-3}$ | $-3.605 \times 10^{-4}$ |
| 2 | −2.798 | $-6.642 \times 10^{-3}$ | $1.276 \times 10^{-2}$ | $-2.151 \times 10^{-3}$ | $-4.993 \times 10^{-5}$ |
| 15 | 1.000 | 0.000 | $1.318 \times 10^{-2}$ | 0.000 | $-6.410 \times 10^{-4}$ |
| 16 | 1.000 | 0.000 | $1.337 \times 10^{-2}$ | 0.000 | $-4.689 \times 10^{-4}$ |

| Surface Nos. | $A_7$ | $A_8$ | $A_9$ | $A_{10}$ | $A_{11}$ | $A_{12}$ |
|---|---|---|---|---|---|---|
| 1 | $1.362 \times 10^{-4}$ | $-8.198 \times 10^{-6}$ | $-1.255 \times 10^{-6}$ | $1.207 \times 10^{-7}$ | $1.036 \times 10^{-8}$ | $-1.168 \times 10^{-9}$ |
| 2 | $1.287 \times 10^{-5}$ | $-1.173 \times 10^{-6}$ | $1.866 \times 10^{-8}$ | $-9.160 \times 10^{-8}$ | $-5.958 \times 10^{-8}$ | $5.852 \times 10^{-9}$ |
| 15 | 0.000 | $3.830 \times 10^{-5}$ | 0.000 | $6.133 \times 10^{-6}$ | 0.000 | 0.000 |
| 16 | 0.000 | $1.790 \times 10^{-5}$ | 0.000 | $8.532 \times 10^{-6}$ | 0.000 | 0.000 |

Values corresponding to the respective conditional expressions (1) through (7) of Example 2 are as provided in Table 11 which will be described later, and all of the conditional expressions (1) through (7) are satisfied (all of the conditional expression (8) and (9) are also satisfied).

EXAMPLE 3

A projection lens of Example 3 is as shown in FIG. 2. The projection lens is essentially identical in configuration to the projection lens of Example 1, and explanations of common elements are omitted.

An upper row of Table 5 shows a value of a radius of curvature R of each of lens surfaces of the projection lens of Example 3, a value of on-axis surface spacing D of each of the lenses, a value of a refractive index $N_d$ achieved along d-line of each of the lenses, and a value of an Abbe number $v_d$ achieved along d-line of each of the lenses. Lower rows of Table 5 show a projection distance (spacing between a conjugate position on the enlargement side and the first surface of the lens).

TABLE 5

| | Focal Length F = 1.00 | | | |
|---|---|---|---|---|
| Surface Nos. | R | D | $N_d$ | $v_d$ |
| 1* | −7.287 | 1.173 | 1.49100 | 57.6 |
| 2* | −12.924 | 0.734 | | |

TABLE 5-continued

| | Focal Length F = 1.00 | | | |
|---|---|---|---|---|
| Surface Nos. | R | D | $N_d$ | $v_d$ |
| 3 | 12.861 | 0.421 | 1.84666 | 23.8 |
| 4 | 5.199 | 3.657 | | |
| 5 | −27.476 | 0.261 | 1.71300 | 53.9 |
| 6 | 3.085 | 2.817 | 1.63980 | 34.5 |
| 7 | −3.855 | 1.341 | 1.80400 | 46.6 |
| 8 | 10.984 | 13.033 | | |
| 9 (STO) | ∞ | 2.857 | | |
| 10 | 4.669 | 0.778 | 1.84666 | 23.8 |
| 11 | 16.985 | 1.312 | | |
| 12 | −21.473 | 0.209 | 1.80400 | 46.6 |
| 13 | 3.074 | 1.567 | 1.49700 | 81.6 |
| 14 | −6.264 | 0.050 | | |
| 15* | −4.865 | 0.419 | 1.49100 | 57.6 |
| 16* | −9.129 | 0.050 | | |
| 17 | 7.528 | 1.505 | 1.48749 | 70.2 |
| 18 | −3.035 | 0.221 | 1.83400 | 37.2 |
| 19 | 5.517 | 1.347 | 1.49700 | 81.6 |
| 20 | −6.913 | 0.067 | | |
| 21 | 13.121 | 1.641 | 1.49700 | 81.6 |
| 22 | −4.527 | 3.853 | | |
| 23 | ∞ | 6.393 | 1.51633 | 64.1 |
| 24 | ∞ | | | |

*designates an aspherical surface
Spacing between a conjugate position on the enlargement side and the first surface of a lens: 118.639

Table 6 shows values of respective constants K and $A_3$ to $A_{20}$ corresponding to respective aspherical surfaces.

TABLE 6

| Aspherical Coefficients | | | | | |
|---|---|---|---|---|---|
| Surface Nos. | K | $A_3$ | $A_4$ | $A_5$ | $A_6$ |
| 1 | 0.000 | $-8.307 \times 10^{-3}$ | $1.372 \times 10^{-2}$ | $-1.951 \times 10^{-3}$ | $-3.768 \times 10^{-4}$ |
| 2 | −2.798 | $-1.034 \times 10^{-2}$ | $1.431 \times 10^{-2}$ | $-2.430 \times 10^{-3}$ | $-3.022 \times 10^{-5}$ |
| 15 | 1.000 | 0.000 | $1.680 \times 10^{-2}$ | 0.000 | $-9.675 \times 10^{-4}$ |
| 16 | 1.000 | 0.000 | $1.594 \times 10^{-2}$ | 0.000 | $-7.266 \times 10^{-4}$ |

| Surface Nos. | $A_7$ | $A_8$ | $A_9$ | $A_{10}$ | $A_{11}$ |
|---|---|---|---|---|---|
| 1 | $1.290 \times 10^{-4}$ | $-7.302 \times 10^{-6}$ | $-1.144 \times 10^{-6}$ | $1.080 \times 10^{-7}$ | $8.532 \times 10^{-9}$ |
| 2 | $1.611 \times 10^{-5}$ | $-1.134 \times 10^{-6}$ | $1.657 \times 10^{-6}$ | $-1.002 \times 10^{-7}$ | $-5.531 \times 10^{-8}$ |
| 15 | 0.000 | $4.256 \times 10^{-5}$ | 0.000 | $5.471 \times 10^{-6}$ | 0.000 |
| 16 | 0.000 | $7.160 \times 10^{-6}$ | 0.000 | $7.384 \times 10^{-6}$ | 0.000 |

| Surface Nos. | $A_{12}$ | $A_{13}$ | $A_{14}$ | $A_{15}$ | $A_{16}$ |
|---|---|---|---|---|---|
| 1 | $-1.044 \times 10^{-9}$ | $-8.385 \times 10^{-12}$ | $1.154 \times 10^{-12}$ | $2.195 \times 10^{-13}$ | $2.674 \times 10^{-14}$ |
| 2 | $6.039 \times 10^{-9}$ | $7.933 \times 10^{-12}$ | $2.907 \times 10^{-12}$ | $5.258 \times 10^{-14}$ | $-8.524 \times 10^{-14}$ |

| Surface Nos. | $A_{17}$ | $A_{18}$ | $A_{19}$ | $A_{20}$ |
|---|---|---|---|---|
| 1 | $-1.359 \times 10^{-15}$ | $-6.387 \times 10^{-16}$ | $-6.797 \times 10^{-17}$ | $1.136 \times 10^{-17}$ |
| 2 | $-1.304 \times 10^{-14}$ | $-2.302 \times 10^{-15}$ | $2.496 \times 10^{-16}$ | $6.851 \times 10^{-18}$ |

Values corresponding to the respective conditional expressions (1) through (7) of Example 3 are as provided in Table 11 which will be described later, and all of the conditional expressions (1) through (7) are satisfied (all of the conditional expression (8) and (9) are also satisfied).

EXAMPLE 4

A projection lens of Example 4 is essentially identical in configuration to a projection lens of Example 3 which is shown in FIG. 2. FIG. 2 is used as an example overview, and explanations about common elements are omitted.

An upper row of Table 7 shows a value of a radius of curvature R of each of lens surfaces of the projection lens of Example 4, a value of on-axis surface spacing D of each of the lenses, a value of a refractive index $N_d$ achieved along d-line of each of the lenses, and a value of an Abbe number $\nu_d$ achieved along d-line of each of the lenses. Lower rows of Table 7 show a projection distance (spacing between a conjugate position on the enlargement side and the first surface of the lens).

TABLE 7

| | Focal Length F = 1.00 | | | |
|---|---|---|---|---|
| Surface Nos. | R | D | $N_d$ | $\nu_d$ |
| 1* | −7.279 | 1.172 | 1.49100 | 57.6 |
| 2* | −13.253 | 0.688 | | |

TABLE 7-continued

| | Focal Length F = 1.00 | | | |
|---|---|---|---|---|
| Surface Nos. | R | D | $N_d$ | $\nu_d$ |
| 3 | 12.750 | 0.420 | 1.84666 | 23.8 |
| 4 | 5.170 | 3.635 | | |
| 5 | −26.935 | 0.261 | 1.71300 | 53.9 |
| 6 | 3.025 | 2.930 | 1.63980 | 34.5 |
| 7 | −3.780 | 1.339 | 1.80400 | 46.6 |
| 8 | 11.568 | 12.934 | | |
| 9 (STO) | ∞ | 2.849 | | |
| 10 | 4.674 | 0.810 | 1.84666 | 23.8 |
| 11 | 16.877 | 1.261 | | |
| 12 | −22.725 | 0.209 | 1.80400 | 46.6 |
| 13 | 3.042 | 1.587 | 1.49700 | 81.6 |
| 14 | −6.397 | 0.050 | | |
| 15* | −5.014 | 0.420 | 1.49100 | 57.6 |
| 16* | −9.590 | 0.050 | | |
| 17 | 7.406 | 1.527 | 1.48749 | 70.2 |
| 18 | −3.069 | 0.221 | 1.83400 | 37.2 |
| 19 | 5.567 | 1.381 | 1.49700 | 81.6 |
| 20 | −6.976 | 0.067 | | |
| 21 | 13.289 | 1.602 | 1.49700 | 81.6 |
| 22 | −4.545 | 3.853 | | |
| 23 | ∞ | 6.387 | 1.51633 | 64.1 |
| 24 | ∞ | | | |

*designates an aspherical surface
Spacing between a conjugate position on the enlargement side and the first face of a lens: 118.697

Table 8 shows values of respective constants K and $A_3$ to $A_{12}$ corresponding to respective aspherical surfaces.

TABLE 8

| Aspherical Coefficients | | | | | |
|---|---|---|---|---|---|
| Surface Nos. | K | $A_3$ | $A_4$ | $A_5$ | $A_6$ |
| 1 | 0.000 | $-8.794 \times 10^{-3}$ | $1.401 \times 10^{-2}$ | $-1.999 \times 10^{-3}$ | $-3.814 \times 10^{-4}$ |
| 2 | −2.798 | $-1.030 \times 10^{-2}$ | $1.416 \times 10^{-2}$ | $-2.407 \times 10^{-3}$ | $-2.536 \times 10^{-5}$ |
| 15 | 1.000 | 0.000 | $1.682 \times 10^{-2}$ | 0.000 | $-9.533 \times 10^{-4}$ |
| 16 | 1.000 | 0.000 | $1.604 \times 10^{-2}$ | 0.000 | $-7.030 \times 10^{-4}$ |
| Surface Nos. | $A_7$ | $A_8$ | $A_9$ | $A_{10}$ | $A_{11}$ |
| 1 | $1.304 \times 10^{-4}$ | $-7.213 \times 10^{-6}$ | $-1.156 \times 10^{-6}$ | $1.075 \times 10^{-7}$ | $8.136 \times 10^{-9}$ |
| 2 | $1.598 \times 10^{-5}$ | $-1.233 \times 10^{-6}$ | $1.654 \times 10^{-6}$ | $-1.035 \times 10^{-7}$ | $-5.533 \times 10^{-8}$ |
| 15 | 0.000 | $3.533 \times 10^{-5}$ | 0.000 | $6.355 \times 10^{-6}$ | 0.000 |
| 16 | 0.000 | $-4.415 \times 10^{-7}$ | 0.000 | $8.291 \times 10^{-6}$ | 0.000 |
| Surface Nos. | $A_{12}$ | $A_{13}$ | $A_{14}$ | $A_{15}$ | $A_{16}$ |
| 1 | $-1.083 \times 10^{-9}$ | $-6.686 \times 10^{-12}$ | $2.059 \times 10^{-12}$ | $4.140 \times 10^{-13}$ | $3.868 \times 10^{-14}$ |
| 2 | $6.147 \times 10^{-9}$ | $1.148 \times 10^{-11}$ | $2.518 \times 10^{-12}$ | $6.104 \times 10^{-15}$ | $-1.374 \times 10^{-13}$ |
| Surface Nos. | $A_{17}$ | $A_{18}$ | $A_{19}$ | $A_{20}$ | |
| 1 | $-1.935 \times 10^{-15}$ | $-1.170 \times 10^{-15}$ | $-1.837 \times 10^{-16}$ | $2.609 \times 10^{-17}$ | |
| 2 | $-1.934 \times 10^{-14}$ | $-9.989 \times 10^{-16}$ | $5.613 \times 10^{-16}$ | $-2.892 \times 10^{-17}$ | |

Values corresponding to the respective conditional expressions (1) through (7) of Example 4 are as provided in Table 11 which will be described later, and all of the conditional expressions (1) through (7) are satisfied (all of the conditional expression (8) and (9) are also satisfied).

EXAMPLE 5

A projection lens of Example 5 is essentially identical in configuration to a projection lens of Example 3 which is shown in FIG. 2. FIG. 2 is used as an example overview, and explanations about common elements are omitted.

An upper row of Table 9 shows a value of a radius of curvature R of each of lens surfaces of the projection lens of Example 5, a value of on-axis surface spacing D of each of the lenses, a value of a refractive index $N_d$ achieved along d-line of each of the lenses, and a value of an Abbe number $v_d$ achieved along d-line of each of the lenses. Lower rows of Table 9 show a projection distance (spacing between a conjugate position on the enlargement side and the first surface of the lens).

TABLE 9

| | Focal Length F = 1.00 | | | |
|---|---|---|---|---|
| Surface Nos. | R | D | $N_d$ | $v_d$ |
| 1* | −7.555 | 1.164 | 1.49100 | 57.6 |
| 2* | −16.590 | 1.164 | | |

TABLE 9-continued

| | Focal Length F = 1.00 | | | |
|---|---|---|---|---|
| Surface Nos. | R | D | $N_d$ | $v_d$ |
| 3 | 14.087 | 0.382 | 1.84666 | 23.8 |
| 4 | 5.304 | 3.005 | | |
| 5 | −10.038 | 0.258 | 1.65160 | 58.5 |
| 6 | 3.324 | 2.814 | 1.60342 | 38.0 |
| 7 | −3.324 | 0.258 | 1.80400 | 46.6 |
| 8 | 78.839 | 14.723 | | |
| 9 (STO) | ∞ | 2.166 | | |
| 10 | 4.629 | 0.750 | 1.84666 | 23.8 |
| 11 | 15.751 | 1.579 | | |
| 12 | −17.087 | 0.199 | 1.80400 | 46.6 |
| 13 | 2.782 | 1.677 | 1.49700 | 81.6 |
| 14 | −4.932 | 0.033 | | |
| 15* | −4.446 | 0.416 | 1.49100 | 57.6 |
| 16* | −7.151 | 0.033 | | |
| 17 | 12.318 | 1.321 | 1.48749 | 70.2 |
| 18 | −2.995 | 0.216 | 1.83400 | 37.2 |
| 19 | 6.936 | 1.315 | 1.49700 | 81.6 |
| 20 | −6.024 | 0.050 | | |
| 21 | 22.705 | 1.602 | 1.49700 | 81.6 |
| 22 | −4.134 | 3.904 | | |
| 23 | ∞ | 6.185 | 1.51633 | 64.1 |
| 24 | ∞ | | | |

*designates an aspherical surface
Spacing between a conjugate position on the enlargement side and the first face of a lens: 106.319

Table 10 shows values of respective constants K and $A_3$ to $A_{12}$ corresponding to respective aspherical surfaces.

TABLE 10

| Aspherical Coefficients | | | | | |
|---|---|---|---|---|---|
| Surface Nos. | K | $A_3$ | $A_4$ | $A_5$ | $A_6$ |
| 1 | 1.000 | $-7.197 \times 10^{-3}$ | $1.402 \times 10^{-2}$ | $-2.063 \times 10^{-3}$ | $-3.514 \times 10^{-4}$ |
| 2 | −2.798 | $-8.732 \times 10^{-3}$ | $1.322 \times 10^{-2}$ | $-2.012 \times 10^{-3}$ | $-4.304 \times 10^{-5}$ |
| 15 | 1.000 | 0.000 | $1.108 \times 10^{-2}$ | 0.000 | $3.978 \times 10^{-4}$ |
| 16 | 1.000 | 0.000 | $1.152 \times 10^{-2}$ | 0.000 | $4.553 \times 10^{-4}$ |

| Surface Nos. | $A_7$ | $A_8$ | $A_9$ | $A_{10}$ | $A_{11}$ | $A_{12}$ |
|---|---|---|---|---|---|---|
| 1 | $1.356 \times 10^{-4}$ | $-8.434 \times 10^{-6}$ | $-1.271 \times 10^{-6}$ | $1.224 \times 10^{-7}$ | $1.082 \times 10^{-8}$ | $-1.143 \times 10^{-9}$ |
| 2 | $1.150 \times 10^{-5}$ | $-1.560 \times 10^{-6}$ | $1.807 \times 10^{-6}$ | $-9.642 \times 10^{-8}$ | $-5.912 \times 10^{-8}$ | $6.150 \times 10^{-9}$ |
| 15 | 0.000 | $-5.396 \times 10^{-5}$ | 0.000 | $1.186 \times 10^{-5}$ | 0.000 | 0.000 |
| 16 | 0.000 | $-5.034 \times 10^{-5}$ | 0.000 | $1.469 \times 10^{-5}$ | 0.000 | 0.000 |

Values corresponding to the respective conditional expressions (1) through (7) of Example 5 are as provided in Table 11 which will be described later, and all of the conditional expressions (1) through (7) are satisfied (all of the conditional expression (8) and (9) are also satisfied).

Values of the respective conditional expressions (1) through (9) corresponding to the previously-described Examples 1 to 5 are shown in Table 11.

TABLE 11

| | Conditional expression | | | | | | |
|---|---|---|---|---|---|---|---|
| | (1) | (2) | (3), (8) | (4), (9) | (5) | (6) | (7) |
| Example 1 | −2.43 | 8.51 | 16.92 | 7.98 | −5.68 | −0.04 | 1.834 |
| Example 2 | −2.33 | 8.57 | 16.46 | 7.98 | −5.62 | −0.02 | 1.834 |
| Example 3 | −2.24 | 8.47 | 15.89 | 8.06 | −5.52 | −0.03 | 1.834 |
| Example 4 | −2.24 | 8.45 | 15.79 | 8.06 | −5.58 | −0.03 | 1.834 |
| Example 5 | −2.46 | 8.48 | 16.88 | 7.97 | −6.21 | −0.03 | 1.834 |

FIGS. 6 through 10 are aberration charts showing aberrations (a spherical aberration, an astigmatism, a distortion, and a lateral chromatic aberration) of the projection lenses of Examples 1 to 5. In these aberration charts, reference symbol ω represents a half angular field. The aberration chart showing spherical aberrations shows aberration curves of d-line, F-line, and C-line. The aberration chart showing the lateral chromatic aberration shows aberration curves of d-line, F-line, and C-line. As shown in FIGS. 6 through 10, the projection lenses of Examples 1 to 5 well compensate for aberrations including the astigmatism and the lateral chromatic aberration. The projection lenses are embodied as wide-angle, bright lenses having half angular fields of 44.4 to 44.7 degrees and F numbers of 2.00 to 2.01.

The projection lens of the present invention is not limited to the projection lenses described in connection with the above examples and is susceptible to various modifications. For example, the curvature radius R and the lens spacing D (or lens thickness) of each of the lenses can be changed, as required.

Further, the projection display device of the present invention is also not limited to the projection device of the above configuration and can be embodied in the form of various device configurations having the projection lens of the present invention. For instance, a transmissive or reflective liquid-crystal display element or a micro-mirror element in which a plurality of mirrors capable of changing their inclinations are formed in an essential plane (e.g., a digital micromirror device: DMD manufactured by Texas Instruments Incorporated) can be used as the light valves. Moreover, an appropriate configuration corresponding to the type of a light valve can also be adopted as the illumination optical system.

As a result of being provided with these configurations, the projection lens of the present invention is configured to be wide-angle; to enable arrangement of an optical path deflection section, such as a mirror, in a system; and to be suitable for miniaturization. Moreover, the projection lens can be made compatible with a recent light valve; particularly, a light valve whose display surface is miniaturized, and can properly compensate for aberrations; especially, a chromatic aberration, thereby enabling enhancement of a resolution.

The projection display device of the present invention uses the projection lens of the present invention, whereby the profile and thickness of the projection display device can be reduced. In particularly, a high-resolution large screen whose chromatic aberration is well compensated for can be obtained.

The entire disclosure of each and every foreign patent application from which the benefit of foreign priority has been claimed in the present application is incorporated herein by reference, as if fully set forth.

What is claimed is:

1. A projection lens comprising:
a first lens group having a negative refractive power; and
a second lens group having a positive refractive power,
the first lens group and the second lens group being arranged in order from an enlargement side,
wherein an interval between the first lens group and the second lens group is set to longest air spacing in the projection lens;
each of the first lens group and the second lens group comprises at least one cemented triplet lens in which three lenses are cemented together; and
conditional expression (1) through (4) provided below are satisfied $$-3.5 < f_1/f < -1.2 \qquad (1)$$

$$8.0 \leq f_2/f < 12.0 \qquad (2)$$

$$6.0 < D_{G1G2}/f \qquad (3)$$

$$5.0 < Bf/f \qquad (4)$$

where
f: a focal length of the projection lens
$f_1$: a focal length of the first lens group
$f_2$: a focal length of the second lens group
$D_{G1G2}$: air spacing between the first lens group and the second lens group
Bf: an air equivalent length between a reduction-side lens surface of a lens, closest to the reduction side, of the second lens group and a reduction-side image-formation surface of the projection lens.

2. The projection lens according to claim 1,
wherein at least one of the cemented triplet lenses disposed in the second lens group is formed by sandwiching one negative lens between two positive lenses; and
conditional expression (6) and (7) provided below are satisfied $$-0.15 < f/f_{TC2} < 0.1 \qquad (6)$$

$$1.77 < N_d \qquad (7)$$

where
$f_{TC2}$: a focal length of a cemented triplet lens placed in the second lens group
$N_d$: a refractive index of, with respect to d-line, a negative lens constituting the cemented triplet lens located in the second lens group.

3. The projection lens according to claim 1,
wherein a cemented triplet lens formed by sandwiching one positive lens between two negative lenses is disposed on a side of the first lens group closest to the reduction side; and
a conditional expression (5) provided below is satisfied $$-8.0 < f_{TC1}/f < -3.0 \qquad (5)$$

where
$f_{TC1}$: a focal length of a cemented triplet lens located on a side of the first lens group closest to the reduction side.

4. The projection lens according to claim 1,
wherein conditional expression (8) and (9) provided below are satisfied $$10.0 < D_{G1G2}/f \qquad (8)$$

$$6.5 < Bf/f \qquad (9).$$

5. The projection lens according to claim 1,
wherein the first lens group comprises, in order from the enlargement side, an aspherical lens having a small refractive power, a negative meniscus lens whose concave surface is oriented toward the reduction side, and a cemented triplet lens formed by sandwiching one biconvex lens between two negative lenses.

6. The projection lens according to claim 1, further comprising an optical path deflection section that deflects an optical path, the optical path deflection section being interposed between the first lens group and the second lens group.

7. The projection lens according to claim 1,
wherein an aspherical lens is disposed in each of: a side of the first lens group located closest to the enlargement side; and the second lens group, and
the aspherical lens placed on a side of the first lens group located closest to the enlargement side is made movable in the direction of an optical axis of the first lens group according to a change in projection distance, so as to enable compensation of a curvature of field induced by the change in projection distance.

8. The projection lens according to claim 1,
wherein the first lens group is made movable in the direction of the optical axis of the first lens group, so as to enable adjustment of a focus.

9. A projection lens comprising:
a first lens group having a negative refractive power; and
a second lens group having a positive refractive power,
the first lens group and the second lens group being arranged in order from an enlargement side,
wherein an interval between the first lens group and the second lens group is set to longest air spacing in the projection lens;
the first lens group comprises a cemented triplet lens in which one positive lens is sandwiched between two negative lenses, the cemented triplet lens being disposed on a side of the first lens group located closest to a reduction side;
the reduction side is made essentially telecentric; and
conditional expression (1) through (5) provided below are satisfied $$-3.5 < f_1/f < -1.2 \qquad (1)$$

$$8.0 \leq f_2/f < 12.0 \qquad (2)$$

$$6.0 < D_{G1G2}/f \qquad (3)$$

$$5.0 < Bf/f \qquad (4)$$

$$-8.0 < f_{TC1}/f < -3.0 \qquad (5)$$

where
f: a focal length of the projection lens
$f_1$: a focal length of the first lens group
$f_2$: a focal length of the second lens group
$D_{G1G2}$: air spacing between the first lens group and the second lens group
Bf: an air equivalent length between a reduction-side lens surface of a lens, closest to the reduction side, of the second lens group and a reduction-side image-formation surface of the projection lens $f_{TC1}$: a focal length of a cemented triplet lens on a side of the first lens group closest to the reduction side.

10. The projection lens according to claim 9,
wherein conditional expression (8) and (9) provided below are satisfied $$10.0 < D_{G1G2}/f \qquad (8)$$

$$6.5 < Bf/f \qquad (9).$$

11. The projection lens according to claim 9,
wherein the first lens group comprises, in order from the enlargement side, an aspherical lens having a small refractive power, a negative meniscus lens whose concave surface is oriented toward the reduction side, and a cemented triplet lens formed by sandwiching one biconvex lens between two negative lenses.

12. The projection lens according to claim 9, further comprising an optical path deflection section that deflects an optical path, the optical path deflection section being interposed between the first lens group and the second lens group.

13. The projection lens according to claim 9,
wherein an aspherical lens is disposed in each of: a side of the first lens group located closest to the enlargement side; and the second lens group, and
the aspherical lens placed on a side of the first lens group located closest to the enlargement side is made movable in the direction of an optical axis of the first lens group according to a change in projection distance, so as to enable compensation of a curvature of field induced by the change in projection distance.

14. The projection lens according to claim 9,
wherein the first lens group is made movable in the direction of the optical axis of the first lens group, so as to enable adjustment of a focus.

15. A projection lens comprising:
a first lens group having a negative refractive power; and
a second lens group having a positive refractive power,
the first lens group and the second lens group being arranged in order from an enlargement side,
wherein an interval between the first lens group and the second lens group is set to longest air spacing in the projection lens;
the second lens group comprises at least one cemented triplet lens in which one negative lens is sandwiched between two positive lenses;
the reduction side is made essentially telecentric; and
conditional expression (1) through (4), (6), and (7) provided below are satisfied $$-3.5 < f_1/f < -1.2 \qquad (1)$$

$$8.0 \leq f_2/f < 12.0 \qquad (2)$$

$$6.0 < D_{G1G2}/f \qquad (3)$$

$$5.0 < Bf/f \qquad (4)$$

$$-0.15 < f/f_{TC2} < 0.1 \qquad (6)$$

$$1.77 < N_d \qquad (7)$$

where
f: a focal length of the projection lens
$f_1$: a focal length of the first lens group
$f_2$: a focal length of the second lens group
$D_{G1G2}$: air spacing between the first lens group and the second lens group Bf: an air equivalent length between a reduction-side lens surface of a lens, closest to the reduction side, of the second lens group and a reduction-side image-formation surface of the projection lens $f_{TC2}$: a focal length of a cemented triplet lens placed in the second lens group $N_d$: a refractive index of, with respect to d-line, a negative lens constituting the cemented triplet lens located in the second lens group.

16. The projection lens according to claim 15, wherein a cemented triplet lens formed by sandwiching one positive lens between two negative lenses is disposed on a side of the first lens group closest to the reduction side; and a conditional expression (5) provided below is satisfied $$-8.0 < f_{TC1}/f < -3.0 \quad (5)$$

where $f_{TC1}$: a focal length of a cemented triplet lens located on a side of the first lens group closest to the reduction side.

17. The projection lens according to claim 15, wherein conditional expression (8) and (9) provided below are satisfied $$10.0 < D_{G1G2}/f \quad (8)$$

$$6.5 < Bf/f \quad (9).$$

18. The projection lens according to claim 15, wherein the first lens group comprises, in order from the enlargement side, an aspherical lens having a small refractive power, a negative meniscus lens whose concave surface is oriented toward the reduction side, and a cemented triplet lens formed by sandwiching one biconvex lens between two negative lenses.

19. The projection lens according to claim 15, further comprising an optical path deflection section that deflects an optical path, the optical path deflection section being interposed between the first lens group and the second lens group.

20. The projection lens according to claim 15, wherein an aspherical lens is disposed in each of: a side of the first lens group located closest to the enlargement side; and the second lens group, and the aspherical lens placed on a side of the first lens group located closest to the enlargement side is made movable in the direction of an optical axis of the first lens group according to a change in projection distance, so as to enable compensation of a curvature of field induced by the change in projection distance.

21. The projection lens according to claim 15, wherein the first lens group is made movable in the direction of the optical axis of the first lens group, so as to enable adjustment of a focus.

* * * * *